US010225347B2

(12) United States Patent
Xiao et al.

(10) Patent No.: US 10,225,347 B2
(45) Date of Patent: Mar. 5, 2019

(54) MESSAGE CONTROLLED APPLIANCES

(71) Applicant: Verizon Patent and Licensing Inc., Basking Ridge, NJ (US)

(72) Inventors: Hong Xiao, Acton, MA (US); Azim Nasir, Foxboro, MA (US); Dongchen Wang, Concord, MA (US); Andre R. Turner, Belmont, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 44 days.

(21) Appl. No.: 14/140,089

(22) Filed: Dec. 24, 2013

(65) Prior Publication Data

US 2015/0180976 A1 Jun. 25, 2015

(51) Int. Cl.
| | |
|---|---|
| *H04L 29/08* | (2006.01) |
| *H04W 4/80* | (2018.01) |
| *H04L 12/28* | (2006.01) |
| *G06F 21/55* | (2013.01) |
| *G06F 21/57* | (2013.01) |

(52) U.S. Cl.
CPC ............. *H04L 67/12* (2013.01); *H04L 67/18* (2013.01); *H04L 67/22* (2013.01); *H04W 4/80* (2018.02); *G06F 21/55* (2013.01); *G06F 21/552* (2013.01); *G06F 21/577* (2013.01); *H04L 12/2803* (2013.01); *H04L 12/2805* (2013.01); *H04L 12/2823* (2013.01)

(58) Field of Classification Search
CPC . H04L 12/2809; H04L 12/282; H04L 12/285; H04L 12/2803; H04L 12/2816; H04L 12/2827; H04L 29/08108; H04L 29/08567; H04L 67/327; H04L 67/12; H04L 67/22; H04L 67/18; H04L 67/2847; H04L 12/2805; H04L 12/2823; H04B 2203/5458; Y02B 70/3266; Y04S 20/242; G06F 21/55; G06F 21/552; G06F 21/577
USPC ................................. 709/203, 202, 213, 217
See application file for complete search history.

(56) References Cited

U.S. PATENT DOCUMENTS

| | | | |
|---|---|---|---|
| 7,921,686 B2 * | 4/2011 | Bagepalli et al. .............. 70/223 |
| 9,401,822 B2 * | 7/2016 | McCoy ................... H04L 12/66 |
| 2003/0231602 A1 * | 12/2003 | Slemmer ............ H04L 12/2805 370/282 |
| 2005/0015624 A1 * | 1/2005 | Ginter ..................... G06F 21/55 726/4 |
| 2007/0192486 A1 * | 8/2007 | Wilson et al. ................. 709/225 |

(Continued)

OTHER PUBLICATIONS

Gill K, Yang SH, Yao F, Lu X. A zigbee-based home automation system. IEEE Transactions on consumer Electronics. May 2009;55 (2). (Year: 2009).*

*Primary Examiner* — Ranodhi Serrao
*Assistant Examiner* — James N Fiorillo

(57) ABSTRACT

A method, performed by a computer device, may include receiving an event notification of an event type associated with a source device in an appliance network. The method may further include detecting an activity initiated by a user in connection with the event type associated with the source device; generating an activity rule that associates the event type with the detected activity; receiving another event notification for the event type associated with the source device; and executing another activity in response to the received other event notification, based on the generated activity rule.

20 Claims, 13 Drawing Sheets

(56) References Cited

U.S. PATENT DOCUMENTS

| | | | |
|---|---|---|---|
| 2010/0262467 A1* | 10/2010 | Barnhill, Jr. | H04L 12/2809 709/223 |
| 2011/0149803 A1* | 6/2011 | McCormack | H04W 8/005 370/254 |
| 2012/0023190 A1* | 1/2012 | Backholm | H04W 52/0254 709/217 |
| 2012/0096107 A1* | 4/2012 | Hatanaka | H04L 12/2823 709/213 |
| 2012/0291068 A1* | 11/2012 | Khushoo et al. | 725/38 |
| 2013/0339136 A1* | 12/2013 | Parikh | G06Q 30/02 705/14.49 |
| 2014/0023363 A1* | 1/2014 | Apte | H04L 12/2803 398/43 |
| 2014/0167931 A1* | 6/2014 | Lee et al. | 340/12.5 |
| 2014/0266669 A1* | 9/2014 | Fadell | G05B 19/042 340/501 |
| 2015/0082225 A1* | 3/2015 | Shearer | G06F 3/0482 715/771 |
| 2015/0127712 A1* | 5/2015 | Fadell | G06Q 10/083 709/202 |

* cited by examiner

1200

MESSAGE CONTROLLED APPLIANCES

BACKGROUND INFORMATION

A customer may have a large number of electronic devices in the customer's home. For example, a customer's home may include a television, a computer, a stereo system, an oven, a refrigerator, a washing machine, and/or other electronic devices. A customer may interact with multiple electronic devices within a particular time period and may find it challenging to manage the multiple electronic devices.

DETAILED DESCRIPTION OF PREFERRED EMBODIMENTS

Figure 1:
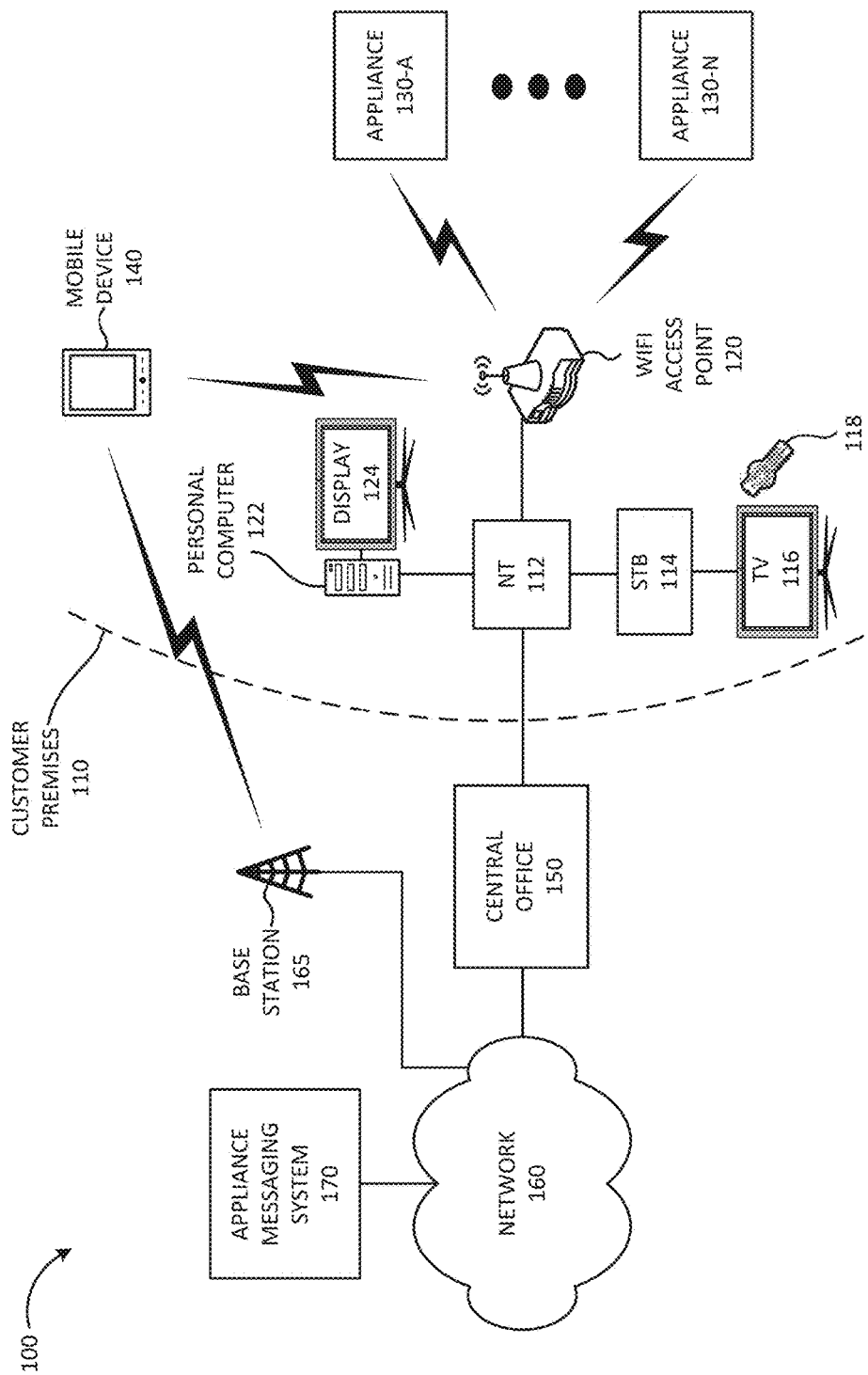
FIG. 1 is a diagram illustrating an environment according to an implementation described herein.

The following detailed description refers to the accompanying drawings. The same reference numbers in different drawings identify the same or similar elements.

Implementations described herein relate to message controlled appliances. An "appliance device," as the term is used herein, may refer to any electronic device associated with a customer premises location, a business premises location, and/or another type of location. Appliances associated with a customer premises location may form an appliance network. The appliances may communicate with each other using a device-to-device short range wireless network (e.g., a Bluetooth, Near Field Communication (NFC) connection, etc.), a WiFi wireless connection, a Long Term Evolution (LTE) wireless connection, and/or a wired connection (e.g., Ethernet, etc.). In some implementations, devices may communicate with an appliance messaging system implemented in one or more server or computer devices. In other implementations, the devices may communicate directly with each other without using a central server or computer device.

A new device may be added to the appliance network if the new device provides an appliance network key. The new device may be assigned an appliance network device identifier (ID), once the new device joins the appliance network, and may receive a list of the devices in the appliance network so that the new device may exchange messages with the other devices in the appliance network.

An appliance device may be configured to send event notifications to other devices in the appliance network. An event notification may inform the other devices that an event of a particular type has occurred in the source device. An event notification may initially be sent to all other devices in the appliance network. A destination device receiving the event notification may determine whether an activity is to be performed by the destination device in connection with the event occurring in the source device. For example, the destination device may determine whether a user has initiated an activity using the destination device within a particular time of the event occurring in the source device. If no activity is detected in the source device, and such a pattern is repeated a particular number of times (e.g., the event occurring in the source device, followed by no activity initiated by the user in the destination device), the destination device may send a notification to the source device, indicating that no event notifications for events of a particular event type need be sent to the destination device.

If the destination device detects an activity initiated by the user in connection with the event occurring in the source device, the destination device may determine whether to generate an activity rule. In some implementations, an activity rule may be generated if a particular activity is initiated by a user in connection with an event occurring in a source device a particular time. The activity rule may be generated automatically or a suggestion may be provided to the user to generate the activity rule. In other implementations, an activity rule may be generated based on a user instruction. In yet other implementations, an activity rule may be generated based on an instruction from the source device associated with the event.

An activity rule may associate an event and an activity in a same device. For example, an activity rule may cause a television to turn off at a particular time if the television is idle for a particular length of time. An activity rule may associate an event in a first device with an activity in a second device. For example, a set temperature being reached in an oven may cause a television to generate a notification and to turn down a volume. An event in a first device may also cause the first device to send event notifications to multiple devices and an activity rule in each of the multiple devices may be executed. For example, the oven may send a "set temperature reached" notification to the television and to a laptop and both the television and the laptop may generate a notification for the user.

An activity rule may be associated with multiple events occurring in multiple devices. For example, a television may be turned off when a motion detector sends a first event notification to the television that no motion has been detected in the customer premises within a time and when a sound detector sends a second event notification to the television that no sound has been detected in the customer premises within the time period. Furthermore, a first activity rule being executed in a second device, in response to an event notification from a first device, may send an event notification to a third device, informing the third device that an event, corresponding to an activity being performed by the second device in response to the activity rule being executed, has occurred. In response, the third device may execute a second activity rule. For example, a first mobile phone may detect arrival at a destination, which may cause the first mobile phone to automatically send a message to a second mobile phone. The second mobile phone may detect receipt of the message, which may cause an activity rule to be executed to forward the message to a television.

FIG. 1 is a diagram of an exemplary environment 100 in which the systems and/or methods described herein may be implemented. As shown in FIG. 1, environment 100 may include a customer premises 110, a central office 150, a network 160, a base station 165, and an appliance messaging system 170.

Customer premises 110 may include a particular location (or multiple locations) associated with a customer. For example, customer premises 110 may include the customer's home. Customer premises 110 may include a network terminal (NT) 112, a set top box (STB) 114, a television 116, a remote control 118, a WiFi access point (AP) 120, a personal computer 122, a display 124, appliances 130-A to 130-N (referred to herein collectively as "appliances 130" and individually as "appliance 130"), and a mobile device 140.

NT 112 may receive content from central office 150 via a connection, such as, for example, a fiber optic cable connection, a coaxial cable connection, a wireless connection, and/or another type of connection. Furthermore, NT 112 may send information from a device associated with customer premises 110 to central office 150. In one implementation, NT 112 may include an optical network terminal and NT 112 and central office 150 may form part of a high-speed fiber optic network. In another implementation, NT 112 may include a cable modem. In yet another implementation, NT 112 may include a fixed wireless transceiver, a WiFi access point, and/or a Bluetooth device. Additionally or alternatively, NT 112 may include a layer 2 and/or layer 3 network device, such as a switch, router, firewall, and/or gateway. Customer premises 110 may receive one or more services via the connection between NT 112 and central office 150, such as, for example, a television service, Internet service, and/or voice communication (e.g., telephone) service.

STB 114 may receive content and output the content to television 116 for display. STB 114 may include a component (e.g., a cable card or a software application) that interfaces with (e.g., plugs into) a host device (e.g., a personal computer, television 116, a stereo system, etc.) and allows the host device to display content. STB 114 may also be implemented as a home theater personal computer (HTPC), an optical disk player (e.g., digital video disk (DVD) or Blu-Ray™ disc player), a cable card, etc. STB 114 may receive commands and/or other type of data from other devices, such as remote control 118, and may transmit the data to other devices in environment 100.

Television 116 may output content received from STB 114. Television 116 may include speakers as well as a display. Remote control 118 may issue wired or wireless commands for controlling other electronic devices, such as television 116 and/or STB 114. Remote control 118, in conjunction with STB 114, may allow a customer to interact with an application running on STB 114. Other types of devices (e.g., a keyboard, mouse, mobile phone, etc.) may be used instead of, or in addition to, remote control 118, in order to control television 116 and/or STB 114.

WiFi AP 120 may be configured to enable wireless devices in customer premises 110 to communicate with each other. For example, WiFi AP 120 may be configured to use IEEE 802.11 standards for implementing a wireless LAN network. WiFi AP 120 may enable appliances 130 and/or mobile device 140 to communicate with each other and/or with NT 112. Personal computer 122 may include a desktop computer, a laptop computer, a tablet computer, and/or another type of computation and/or communication device. Personal computer 122 may include a microphone to capture audio, a camera to capture images or video. Personal computer 122 may include display 124 for displaying images and/or video content received from STB 114. Personal computer 122 may also include a speaker for playing audio signals.

Appliance 130 may include an electronic appliance device with wireless communication capabilities, such as an oven, a microwave, a dishwasher, a dryer, a dish washing machine, a refrigerator; a home monitoring system and/or a device associated with a home monitoring system such as a security sensor (e.g., a motion detector, a sound detector, etc.), a door lock, a window lock, a garage door controller, a light control device, a video monitoring device, and/or another home monitoring device; a climate control device, such as thermostat, an energy meter, an air conditioning (AC) device, a heater, and/or another type of climate control device; and/or another type electronic device.

Appliance 130 may include a wireless transceiver configured to communicate with one or more other appliances 130, WiFi AP 120, and/or base station 165. For example, appliance 130 may include a Bluetooth transceiver, a NFC transceiver, a WiFi transceiver, and/or an LTE transceiver.

Mobile device 140 may include a portable communication device (e.g., a mobile phone, a smart phone, a phablet device, a global positioning system (GPS) device, and/or another type of wireless device); a laptop, tablet, or another type of portable computer; a media playing device; a portable gaming system; and/or any other type of mobile computer device with communication and output capabilities.

Central office 150 may include one or more devices, such as computer devices and/or server devices, which ingest content, store content, format content, and/or deliver content to customer premises 110. For example, central office 150 may provide television channels and/or other type of content from a video content delivery system (not shown in FIG. 1). Furthermore, central office 150 may provide a connection to network 160.

Network 160 may include one or more circuit-switched networks and/or packet-switched networks. For example, network 160 may include a local area network (LAN), a wide area network (WAN), a metropolitan area network (MAN), a Public Switched Telephone Network (PSTN), an ad hoc network, an intranet, the Internet, a fiber optic-based network, a wireless network, and/or a combination of these or other types of networks. Base station 165 may function as a base station that enables wireless devices in customer premises 110 to communicate with network 160. For example, base station 165 may include a Long Term Evolution eNodeB base station, a Global System for Mobile Communications (GSM) base station, a Code Division Multiple Access (CDMA) base station, and/or another type of base station.

Appliance messaging system 170 may include one or more devices, such as computer devices and/or server devices, which are configured to manage activity rules for devices in customer premises 110, to receive event notifications from devices in customer premises 110, and/or to forward event notifications and/or instructions to perform a particular activity to devices in customer premises 110. In some implementations, environment 100 may not include an appliance messaging system 170. In other implementations, environment 100 may include appliance messaging system 170 and appliance messaging system 170 may perform some or all of the processes described below as being performed by devices in customer premises 110.

Although FIG. 1 shows exemplary components of environment 100, in other implementations, environment 100 may include fewer components, different components, differently arranged components, or additional components than the ones depicted in FIG. 1. Additionally or alternatively, one or more components of environment 100 may perform functions described as being performed by one or more other components of environment 100.

Figure 2:
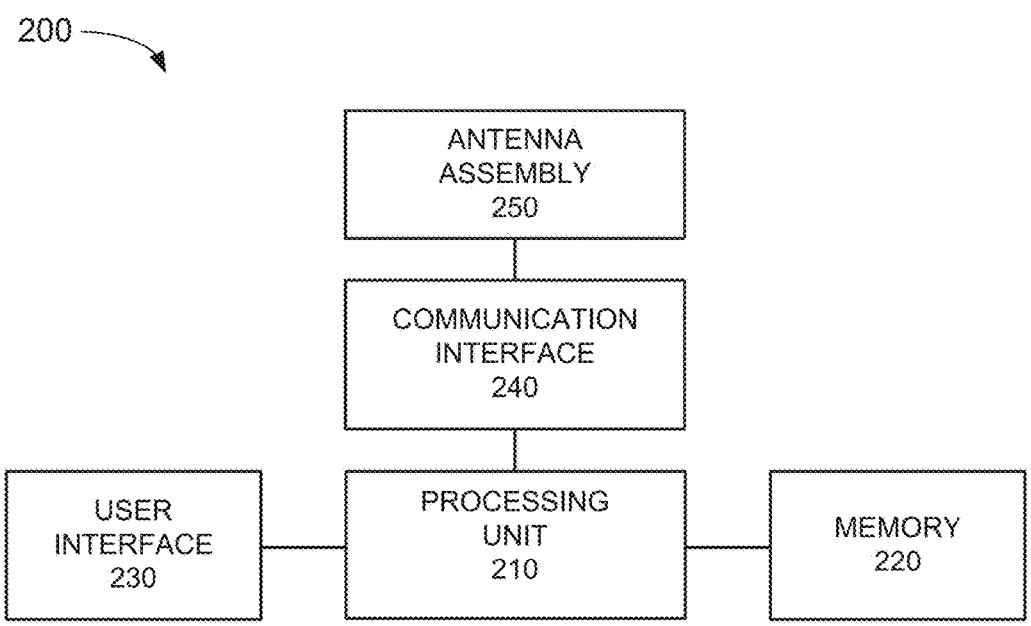
FIG. 2 is a diagram illustrating exemplary components of an appliance device of FIG. 1.

FIG. 2 is a diagram illustrating exemplary components of a device 200 according to an implementation described herein. Appliances 130 and/or mobile device 140 may each include one or more devices 200. As shown in FIG. 2, device 200 may include a processing unit 210, a memory 220, a user interface 230, a communication interface 240, and an antenna assembly 250.

Processing unit 210 may include one or more processors, microprocessors, application specific integrated circuits (ASICs), field programmable gate arrays (FPGAs), and/or other processing logic. Processing unit 210 may control operation of device 200 and its components.

Memory 220 may include a random access memory (RAM) or another type of dynamic storage device, a read only memory (ROM) or another type of static storage device, a removable memory card, and/or another type of memory to store data and instructions that may be used by processing unit 210.

User interface 230 may allow a user to input information to device 200 and/or to output information from device 200. Examples of user interface 230 may include a speaker to receive electrical signals and output audio signals; a camera to receive image and/or video signals and output electrical signals; a microphone to receive sounds and output electrical signals; buttons (e.g., a joystick, control buttons, a keyboard, or keys of a keypad) and/or a touchscreen to receive control commands; a display, such as an LCD, to output visual information; an actuator to cause device 200 to vibrate; a sensor; and/or any other type of input or output device.

Communication interface 240 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 240 may include a transmitter that converts baseband signals to radio frequency (RF) signals and/or a receiver that converts RF signals to baseband signals. Communication interface 240 may be coupled to antenna assembly 250 for transmitting and receiving RF signals.

Communication interface 240 may include a logical component that includes input and/or output ports, input and/or output systems, and/or other input and output components that facilitate the transmission of data to other devices. For example, communication interface 240 may include a network interface card (e.g., Ethernet card) for wired communications and/or a wireless network interface (e.g., a WiFi) card for wireless communications. Communication interface 240 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

Antenna assembly 250 may include one or more antennas to transmit and/or receive RF signals. Antenna assembly 250 may, for example, receive RF signals from communication interface 240 and transmit the signals via an antenna and receive RF signals from an antenna and provide them to communication interface 240.

As described herein, device 200 may perform certain operations in response to processing unit 210 executing software instructions contained in a computer-readable medium, such as memory 220. A computer-readable medium may be defined as a non-transitory memory device. A non-transitory memory device may include memory space within a single physical memory device or spread across multiple physical memory devices. The software instructions may be read into memory 220 from another computer-readable medium or from another device via communication interface 240. The software instructions contained in memory 220 may cause processing unit 210 to perform processes that will be described later. Alternatively, hard-wired circuitry may be used in place of, or in combination with, software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than those depicted in FIG. 2. Additionally or alternatively, one or more components of device 200 may perform the tasks described as being performed by one or more other components of device 200.

Figure 3:
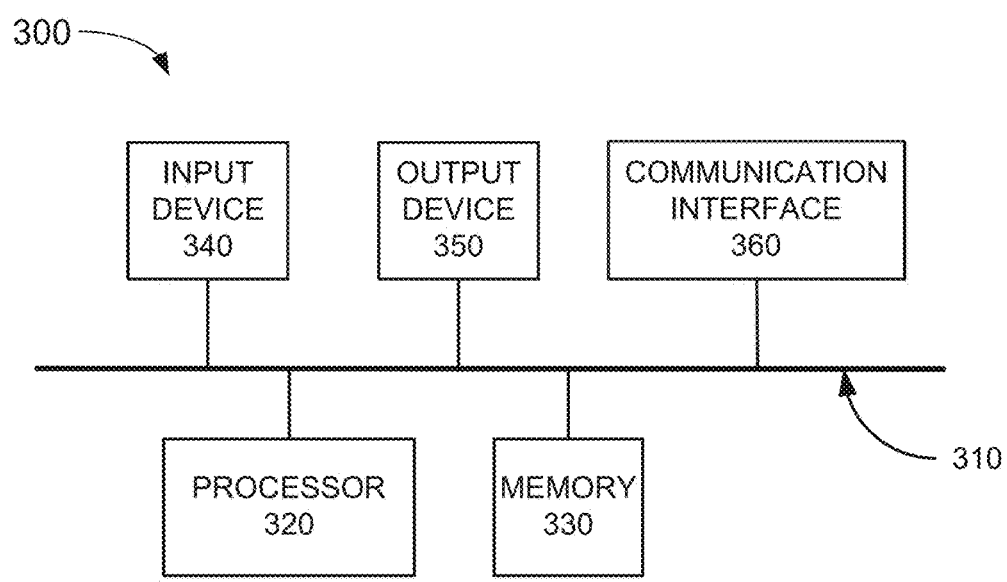
FIG. 3 is a diagram illustrating exemplary components of a customer premises device or the appliance messaging system of FIG. 1.

FIG. 3 is a diagram illustrating exemplary components of device 300 according to an implementation described herein. Each of STB 114, TV 116, personal computer 122, and/or appliance messaging system 170 may include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to an antenna for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to processing messages between one or more devices in customer premises 110 and/or to generating and/or managing activity rule for one or more devices in customer premises 110. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hard-wired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than those depicted in FIG. 3. Additionally or alternatively, one or more components of device 300 may perform one or more tasks described as being performed by one or more other components of device 300.

Figures 4A, 4B:
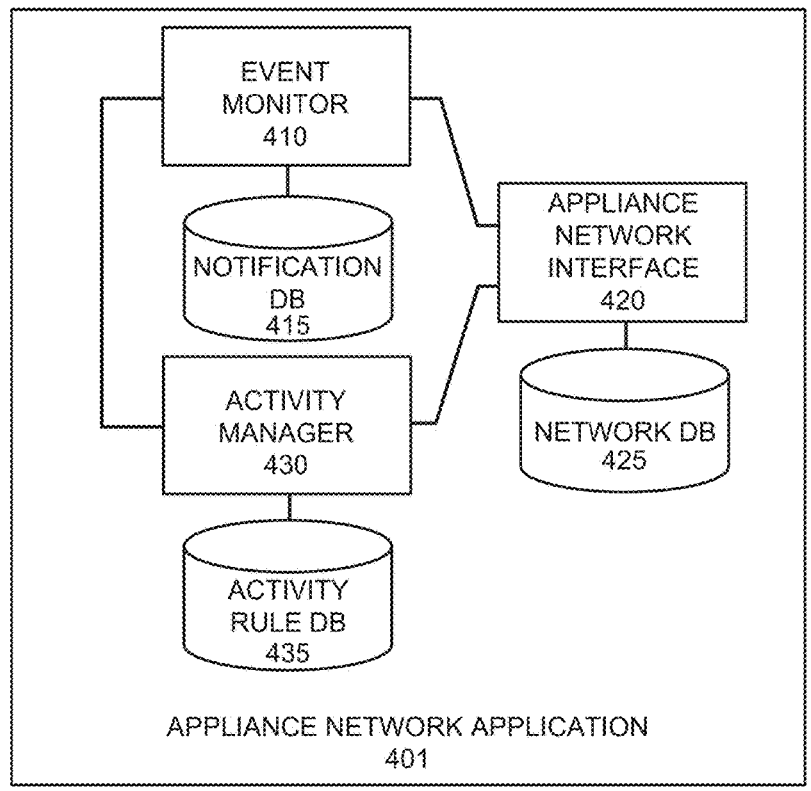
FIG. 4A is a diagram illustrating exemplary functional components of a customer premises device of FIG. 1.
FIG. 4B is a diagram illustrating exemplary components of an activity rule database of FIG. 3A.

FIG. 4A is a diagram illustrating exemplary functional components of device 200 or device 300 according to an implementation described herein. The functional components of device 200 may be implemented, for example, via processing unit 210 executing instructions from memory 220. Alternatively, some or all of the functional components of device 200 may be implemented via hard-wired circuitry. The functional components of device 300 may be implemented, for example, via processor 320 executing instructions from memory 330. Additionally or alternatively, some or all of the functional components of device 300 may be hard-wired.

As shown in FIG. 4A, device 200 may include an appliance network application 401. In some implementations, appliance network application 401 may be provided to device 200 or 300 by appliance messaging system 170. In other implementations, appliance network application 401 may be installed on device 200 or 300 during manufacture (e.g., as part of a chipset). Appliance network application 401 may enable a customer premises device to join an appliance network, to exchange event notifications with devices in an appliance network, to generate activity rules based on event notifications, and/or to perform other functions related to an appliance network associated with customer premises 110. Appliance network application 401 may include an event monitor 410, a notification database (DB) 415, an appliance network interface 420, a network DB 425, an activity manager 430, and an activity rule DB 435.

Event monitor 410 may monitor device 200 or device 300 for events. Event monitor 410 may determine an event type for the event. Detection of an event may be triggered when a user interacts with the device, when a sensor associated with the device detects a change in a measured parameter (e.g., a particular amount of change within a particular period of time), when a device received a message from another device, when the device experiences a change from one state to another (e.g., a state change in a finite state machine in the device), when the device becomes activated or deactivated, when the device experiences a malfunction, and/or based on another type of event associated with the device. In some implementations, event monitor 410 may include a pre-defined list of events that are to be reported to other devices. Additionally or alternatively, event monitor 410 may interpret any change in the device initially as an event and may initially report a change as an event. If no activities are associated with the event, based on activity notifications received from other devices in the appliance network, event monitor 410 may stop to generate event notifications for the event. Event monitor 410 may obtain information relating to a detected event, such as, for example, an event name, a timestamp, and/or one or more other event parameters, and may include the event information in an event notification associated with the event.

Notification DB 415 may store information relating a particular event type to devices in an appliance network that are to receive event notifications relating to the particular event types. For example, a new event type may initially be sent to all devices in the appliance network, as event monitor 410 may not have information indicating which devices in the appliance network would find an event of the new event type relevant. If a first device receives the event notification and determines that an activity has been initiated in connection with the event, associated with the event notification, the first device may send an activity notification back and event monitor 410 may update notification DB 415 to indicate that event notifications for the event type should be sent to the first device. Additionally or alternatively, a second device may send an activity notification back indicating that the event, associated with the event notification, is not relevant to the second device and event monitor 410 may update notification DB 415 to indicate that event notifications for the event type should not be sent to the second device.

Appliance network interface 420 may be configured to communicate with an appliance network interface located in another device on the appliance network. For example, appliance network interface 420 may implement one or more communication protocols to enable devices on an appliance network to communicate. Network DB 425 may store a list of devices that are members of the appliance network. Each device may be identified by an appliance network device ID and one or more addresses that may be used to reach the device. The addresses may include an Internet Protocol (IP) address, a Media Access Control (MAC) address, and/or another kind of address.

Activity manager 430 may generate and manage activity rules associated with appliance network application 401. For example, activity manager 430 may monitor activities initiated by the user and may monitor for event notifications received via appliance network interface 420 and may automatically generate a new activity rule based on monitored activities and event notifications. Activity manager 430 may also activate a particular activity rule based on a received event notification. Furthermore, activity manager 430 may provide information relating to performed activities to event monitor 410 and event monitor 410 may report the activities as events to other devices in the appliance network.

Activity rule DB 435 may store information relating to activity rules associated with appliance network application 401. Exemplary information that may be stored in activity rule DB 435 is described below with reference to FIG. 4B.

Although FIG. 4A shows exemplary functional components of device 200, in other implementations, device 200 may include fewer functional components, different functional components, differently arranged functional components, or additional functional components than those depicted in FIG. 4A. Additionally or alternatively, one or more functional components of device 200 may perform functions described as being performed by one or more other functional components of device 200.

FIG. 4B is a diagram of exemplary components of activity rule DB 435. As shown in FIG. 4B, activity rule DB 435 may store one or more activity rule records 450. Each activity rule record 450 may store information relating to a particular activity rule. An activity rule record 450 may include a rule identifier (ID) field 452, one or more source device ID fields 454 and corresponding one or more source device event fields 456, and an activity field 458.

Rule ID field 452 may identify a particular activity rule. Each source device ID field 454 may identify one or more source devices in the appliance network based on the appliance network device IDs assigned to each source device and/or based on another type of device identifier. A corresponding source device event field 456 may identify an event type associated with the source device identified in the corresponding source device ID field 454.

Activity field 458 may store instructions to perform one or more activities associated with the particular activity rule. The one or more activities may include, for example, instructions to output a message to the user, to send a message to another device, to activate or deactivate a function, to cause the device to assume a particular state, to activate or deactivate the device, and/or to cause the device to perform another activity. The one or more activities may be performed when all source device events identified in source device event field 456 of the activity rule are detected via event notifications within a particular period of time.

Although FIG. 4B shows exemplary components of activity rule DB 435, in other implementations, activity rule DB 435 may include fewer components, different components, differently arranged components, or additional components than depicted in FIG. 4B.

Figure 5:
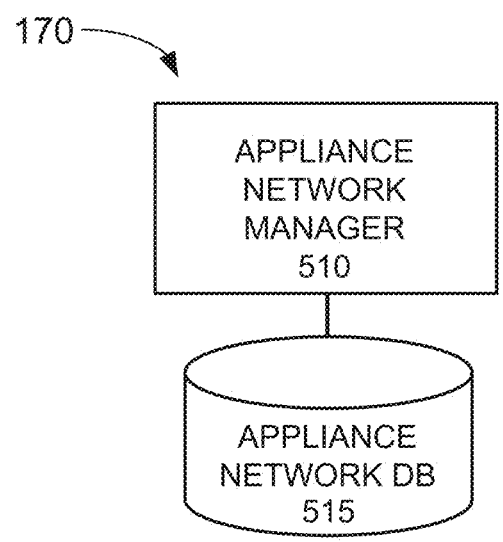
FIG. 5 is a diagram illustrating exemplary functional components of the appliance messaging system of FIG. 1.

FIG. 5 is a diagram illustrating exemplary functional components of appliance messaging system 170. The functional components of appliance messaging system 170 may be implemented, for example, via processor 320 executing instructions from memory 330. Additionally or alternatively, some or all of the functional components of appliance messaging system 170 may be hard-wired. As shown in FIG. 5, appliance messaging system 170 may include an appliance network manager 510 and an appliance network DB 515.

Appliance network manager 510 may manage appliance networks in customer premises 110. Appliance network DB 515 may store information relating to particular appliance network. For example, for a particular appliance network in a particular customer premises 110, appliance network DB 515 may store information similar to information that may be stored in network DB 425 described above with reference to FIG. 4A, such as a list of devices included in the appliance network, appliance network device IDs for the devices, information on how to reach the devices (e.g., an address for each device, such as an IP address), and/or other type of appliance network information. Furthermore, appliance network DB 515 may store information similar to information that may be stored in activity rule DB 435 as described above with reference to FIG. 4B.

Appliance network manager 510 may, for a particular appliance network, perform the functions of activity manager 430 for particular devices in the particular appliance network. Thus, appliance network manager 510 may, for a particular device, monitor activities initiated by the user, may monitor for event notifications received from other devices in the appliance network, and may generate a new activity rule for the particular device based on monitored activities and event notifications. Appliance network manager 510 may also activate a particular activity rule based on a received event notifications. Furthermore, appliance network manager 510 may provide information relating to performed activities to other devices in the appliance network.

Although FIG. 5 shows exemplary functional components of appliance messaging system 170, in other implementations, appliance messaging system 170 may include fewer functional components, different functional components, differently arranged functional components, or additional functional components than those depicted in FIG. 5. Additionally or alternatively, one or more functional components of appliance messaging system 170 may perform functions described as being performed by one or more other functional components of appliance messaging system 170.

Figure 6:
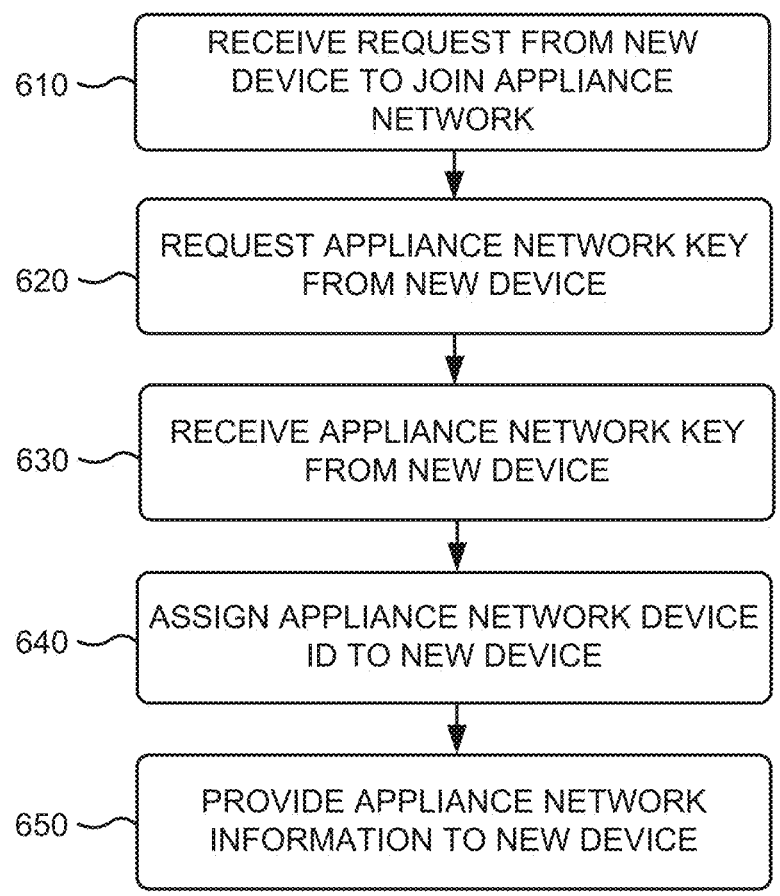
FIG. 6 is a flowchart for adding a device to an appliance network according to an implementation described herein.

FIG. 6 is a flowchart for adding a device to an appliance network according to an implementation described herein.

In one implementation, the process of FIG. 6 may be performed by device 200 or device 300. In other implementations, some or all of the process of FIG. 6 may be performed by another device or a group of devices separate from and/or including device 200 or device 300.

The process of FIG. 6 may include receiving a request from a new device to join an appliance network (block 610). For example, a user may purchase a new appliance and may activate (e.g., turn on) the appliance in customer premises 110. The appliance may seek out wireless networks and/or nearby devices with wireless communication capability and may establish a wireless connection with another device in an appliance network associated with customer premises 110. For example, the appliance may connect to WiFi AP 120 and/or may establish a Bluetooth or NFC connection with the other device. Once a connection is established, appliance network application 401 running on the appliance may announce the presence of the appliance and may request to join the appliance network.

Alternatively, or additionally, the appliance may establish a connection with appliance messaging system 170 via WiFi AP 120 and NT 112, via base station 165, and/or using another method. After establishing a connection with appliance messaging system 170, the appliance may send a request to appliance messaging system 170 to join an appliance network associated with customer premises 110.

A request for an appliance network key may be sent to the new device (block 620) and the appliance network key may be received from the new device (block 630). In order to allow only authorized devices to join an appliance network, and in order to prevent a device from joining an authorized network, the contacted device, or appliance messaging system 170, may identify the appliance network (e.g., by sending the name of the appliance network) and may request an appliance network key from the appliance. The user may enter the appliance network key using an input device of the appliance and the appliance may send the appliance network key back to the appliance network device (or to appliance messaging system 170). In some implementations, the appliance network key may be requested directly by a device in the appliance network. In other implementations, the appliance network key may be requested by appliance messaging system 170.

An appliance network device ID may be assigned to the new device (block 640) and appliance network information may be sent to the new device (block 650). For example, appliance network interface 420 of the contacted device may assign an appliance network ID to the new appliance and may send an updated appliance network device list to all other devices in the appliance network, including the new appliance.

Alternatively, if the appliance does not include an input device, the user may log into the appliance using a device in the appliance network that includes an input device, once the appliance establishes a connection with the device in the appliance network. The user may, for example, enter a serial number of the appliance to access the appliance and to enable the appliance to join the appliance network.

Figure 7:
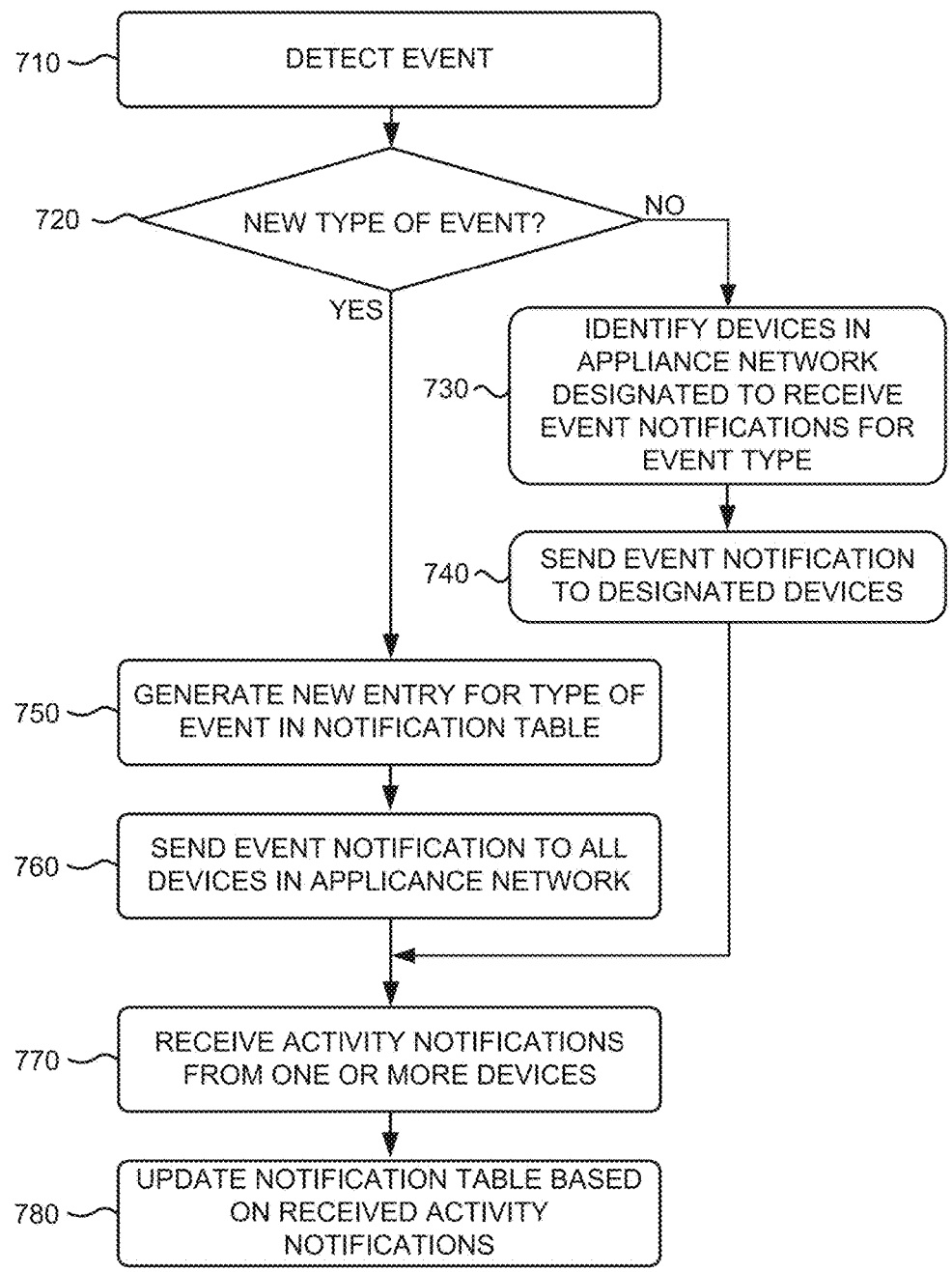
FIG. 7 is a flowchart for providing an event notification to an appliance network according to an implementation described herein.

FIG. 7 is a flowchart for providing an event notification to an appliance network according to an implementation described herein. In one implementation, the process of FIG. 7 may be performed by device 200 or device 300. In other implementations, some or all of the process of FIG. 7 may be performed by another device or a group of devices separate from and/or including device 200 or device 300.

The process of FIG. 7 may include detecting an event (block 710). For example, event monitor 410 may monitor the device for events. An event may be detected when a user interacts with the device, when a sensor associated with the device detects a change in a measured parameter, when a device receives a message from another device, when the device experiences a change from one state to another, when the device becomes activated or deactivated, when the device experiences a malfunction, and/or based on detection of another type of event associated with the device. In some implementations, event monitor 410 may monitor a kernel driver of a processor associated with the device to detect events. In other implementations, the device may be configured to send indications for particular types of events to event monitor 410 and event monitor 410 may detect an event when an indication is received. In yet other implementations, event monitor 410 may use one or more other methods to detect events.

A determination may be made as to whether the event corresponds to a new type of event (block 720). For example, event monitor 410 may identify a type of event associated with the detected event. The type of event may be determined based on an identifier, hash, and/or "fingerprint" associated with the event, such as particular function call, a particular instruction, a particular interrupt, and/or another type of identifier associated with an event. Event monitor 410 may then access notification DB 415 to determine whether an event notification entry exists for the determined type of event.

If it is determined that the event does not correspond to a new type of event (block 720—NO), devices in the appliance network may be identified which are designated to receive event notifications for the event type associated with the event (block 730) and an event notification may be sent to the designated devices (block 740). For example, event monitor 410 may access a notification entry in notification DB 415 corresponding to the determined event type and may obtain a list of devices in the appliance network to which an event notification for the detected event should be sent. Appliance network interface 420 may then send event notifications for the detected event to the devices on the obtained list of devices in the appliance network.

Returning to block 720, if it is determined that the event does correspond to a new type of event (block 720—YES), a new entry may be generated, for a type of event associated with the event, in an event notification table (block 750) and an event notification may be sent to all devices in the appliance network (block 760). For example, event monitor 410 may generate a new notification entry for the determined event type and may initially indicate that event notifications should be sent to all devices in the appliance network. Appliance network interface 420 may then send event notifications for the detected event to all the devices in the appliance network.

Activity notifications may be received from one or more devices (block 770) and the notification table may be updated based on the received activity notifications (block 780). As an example, a device may respond with an activity notification if an activity occurs in the device in connection with the detected event (e.g., within a particular period of time). As another example, a device may respond with an activity notification that no activity occurred in the device in connection with the detected event. Event monitor 410 may update notification DB 415 based on the received activity notifications. For example, if an activity occurred in a particular device in connection with the detected event, event monitor 410 may update the entry for the event type, associated with the detected event, to indicate that event notifications should be sent to the particular device. If an activity did not occur in the particular device in connection with the detected event, event monitor 410 may update the entry for the event type, associated with the detected event, to indicate that event notifications should not be sent to the particular device.

Figure 8:
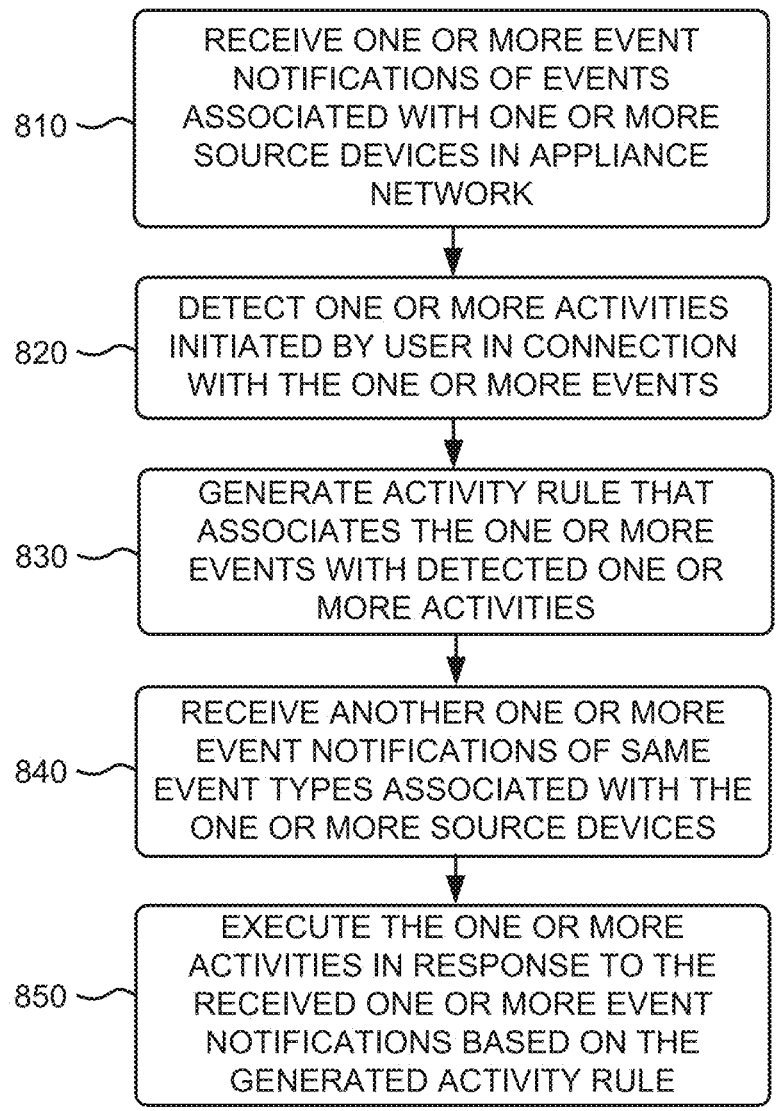
FIG. 8 is a flowchart for generating and using an activity rule according to an implementation described herein.

FIG. 8 is a flowchart for generating and using an activity rule according to an implementation described herein. In one implementation, the process of FIG. 8 may be performed by device 200 or device 300. In other implementations, some or all of the process of FIG. 8 may be performed by another device or a group of devices separate from and/or including device 200 or device 300.

The process of FIG. 8 may include receiving one or more event notifications of events associated with one or more source devices in an appliance network (block 810). For example, a source device may detect an event, may generate an event notification based on the detected event, and may send the event notification to appliance network interface 420 of another device in an appliance network. Alternatively, the source device may send the event notification to appliance messaging system 170. Furthermore, in some situations, multiple event notifications may be received from multiple source devices within a particular period of time.

One or more activities initiated by a user in connection with the one or more events may be detected (block 820). For example, activity manager 430 may detect one or more activities being performed by the device. The activities may be initiated by the user within a particular period of time after the device has received the event notification. Alternatively, appliance messaging system 170 may receive one or more activity notifications from one or more devices in the appliance network within a particular period of time after the event notification was generated.

An activity rule may be generated that associates the detected one or more events in the one or more source devices with the detected one or more activities (block 830). For example, activity manager 430 may select to generate an activity rule in response to detecting the activity initiated by the user within a particular period of time from receiving the event notification. An activity rule may be generated based on one or more criteria. For example, an activity rule may be generated based in response to determining that the particular activity has been initiated by the user in connection with the detected event a particular number of times (e.g., one time, two times, three times, etc.). Thus, an activity rule generation threshold may be set by activity manager 430. Different thresholds may be set for different types of events, for different types of activities, and/or for different event type and activity type combinations. In some implementations, appliance messaging system 170 may maintain a list of different thresholds which may be used to determine when to generate an activity rule.

An activity rule may be generated in response to a user instruction. For example, activity manager 430 may generate a user interface. The user interface may provide an indication to the user, via an output device, that the activity was determined to be connected with an event in another device. The user interface may ask the user if the user would like to automate the behavior and may include one or more options that the user may select and/or configure for the activity rule, such as particular times of day that the activity rule should be in effect, particular event parameters associated with the detected event type that should be satisfied in order for the activity rule to be activated, particular activity parameters that should be selected for the one or more activities to be executed, and/or other selectable options. If the user selects to automate the behavior, indicating that the user would like the activity to be performed automatically, in response to an event of the detected event type occurring in the other device, activity manager 430 may generate an activity rule associated the detected event type with the detected activity.

Alternatively, appliance messaging system 170 may generate one or more activity rules based on activities detected in response to the detected events. Appliance messaging system 170 may generate multiple activity rules for multiple devices based on a particular set of detected activities and received event notifications.

Another one or more event notifications of the same event types associated with the one or more source devices may be received (block 840) and the one or more activities may be executed in response to the received one or more event notifications based on the generated activity rule (block 850). For example, after the activity rule has been generated, the device may receive another one or more event notifications of the same event types from the same one or more source devices. In response, activity manager 430 may determine that the event notifications satisfy the generated activity rule and may execute the one or more activities specified in the activity rule, in response to receiving the event notifications.

Alternatively, after appliance messaging system 170 has generated an activity for a device in customer premises 110, appliance messaging system 170 may receive the event notifications, may determine that the event notifications satisfy one or more activity rules and may send instructions to devices associated with the one or more activity rules to execute activities specified in the one or more activity rules.

One activity rule may trigger another activity rule. For example, a first device may include a first activity rule to generate a first activity based on a first event type detected in the first device. In other words, the first event type and the first activity both take place in the first device. A second activity rule may be generated based on a second event type occurring in a second device and an event notification may be sent to the first device. The first device may detect a second activity in connection with the second event occurring in the second device and may generate a second activity rule that associates the second activity with the second event type. If the second activity corresponds to the first event type, the second activity may trigger the first activity rule to perform the first activity. Thus, the second event type in the second device my trigger the first activity in the first device via two activity rules being executed in sequence.

Figure 9A:
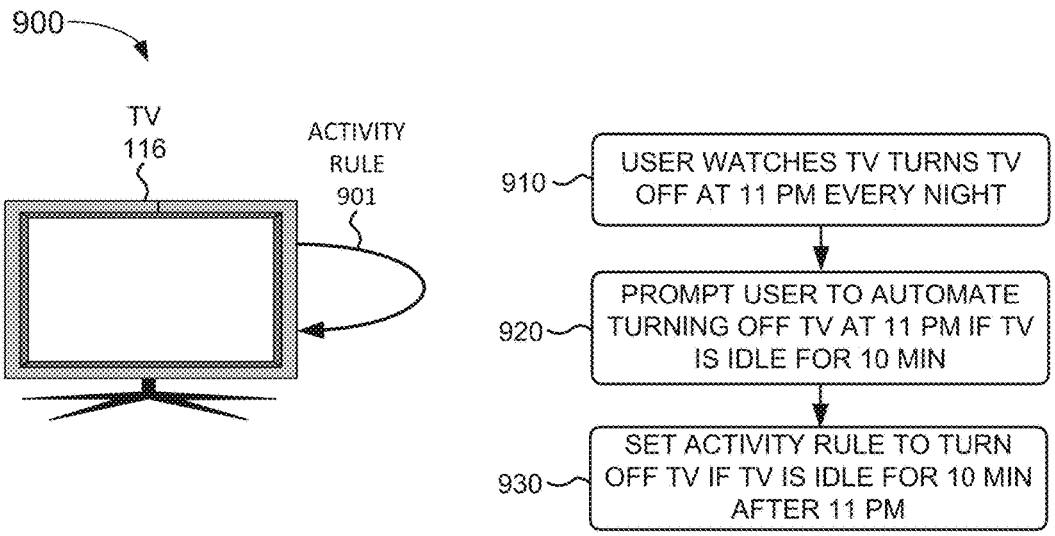
FIGS. 9A and 9B are diagrams of a first exemplary scenario according to an implementation described herein.
Figure 9B:
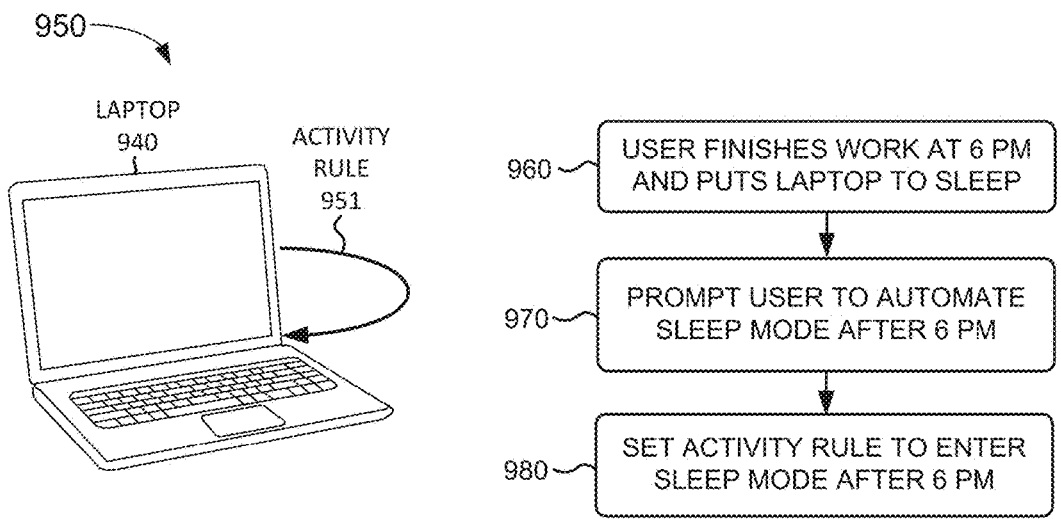

FIGS. 9A and 9B are diagrams of a first exemplary scenario according to an implementation described herein. As shown in FIG. 9A, scenario 900 includes television 116 with an activity rule 901 based on an event occurring in television 116. A user may watch turn off television 116 every night at 11 PM (block 910). After this behavior repeats a number of times, activity manager 340 in television 116 may generate a prompt to ask the user whether the user would like to automate turning off television 116 after 11 PM if television 116 remains in an idle state (e.g., receives no volume or channel change input) for longer than 10 minutes (block 920). If the user agrees, activity manager 430 may set an activity rule to turn off television 116 after 11 PM if television 116 is idle for at least 10 minutes (block 930).

As shown in FIG. 9B, scenario 950 includes laptop 940 with an activity rule 951 based on an event occurring in laptop 940. Laptop 940 may correspond to personal computer 122 or to mobile device 140. A user may finish working on laptop 940 at 6 PM and may instruct laptop 940 to enter a sleep mode (block 960). After this behavior repeats a number of times, activity manager 430 in laptop 940 may generate a prompt to ask the user whether the user would like to automate entering sleep mode after 6 PM (block 970). If the user agrees, activity manager 430 may set an activity rule to instruct laptop 940 to enter a sleep mode after 6 PM (block 980).

Figure 10:
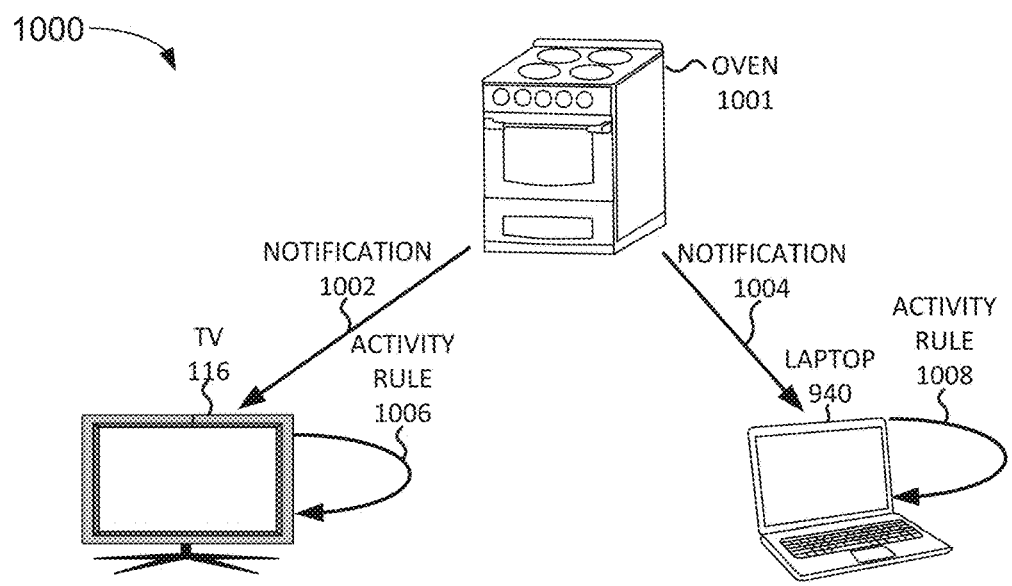
FIG. 10 is a diagram of a second exemplary scenario according to an implementation described herein.
Figure 10:
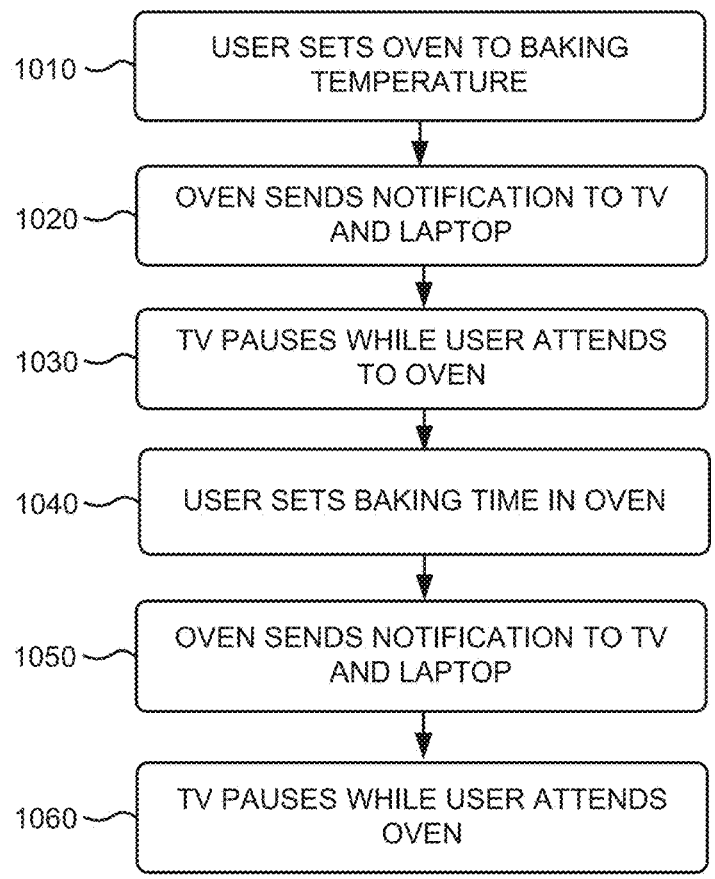

FIG. 10 is a diagram of a second exemplary scenario according to an implementation described herein. As shown in FIG. 10, scenario 1000 includes an oven 1001 sending an event notification 1002 to TV 116 and an event notification 1004 to laptop 940. TV 116 may include an activity rule 1006 to perform an activity based on a particular event occurring in oven 1001 and laptop 940 may also include an activity rule 1008 to perform an activity based on the particular event occurring in oven 1001. Oven 1001, TV 116, and laptop 940 may be part of a same appliance network. Assume that the user bakes using oven 1001 and uses TV 116 and laptop 940 while waiting for the oven to heat up or while waiting for a dish to finish baking. Oven 1001 may generate an event notification when the oven is set to a new temperature, may generate an event notification when the oven reaches the set temperature, may generate an event notification when an oven timer is set, and may generate an event notification when the oven time goes off or expires.

Assume that during previous use of oven 1001, the oven sent an event notification to TV 116 and laptop 940 when oven 1001 reaches a set temperature and TV 116 and laptop 940 displayed a message about the received notification to the user along with a prompt asking the user whether the user would like to automate any activities. Assume the user selects to be notified when oven 1001 reaches a set temperature and when a timer of oven 1001 goes off or expires. The user further selects to pause TV 116 if either type of event occurs in oven 1001. Thus, when user sets oven 1001 to a baking temperature (block 1010), the oven may send a notification to both TV 116 and laptop 940 (block 1020) and TV 116 and laptop 940 may both generate a message to the user that the oven has reached the set temperature and TV 116 may pause (block 1030). The user may subsequently set a baking time for oven 1001 (block 1040) and oven 1001 may send another notification to both TV 116 and laptop 940 (block 1050) when the baking time has elapsed. In response to receiving the notification, TV 116 may again pause while the user attends to oven 1001 (block 1060).

Figure 11:
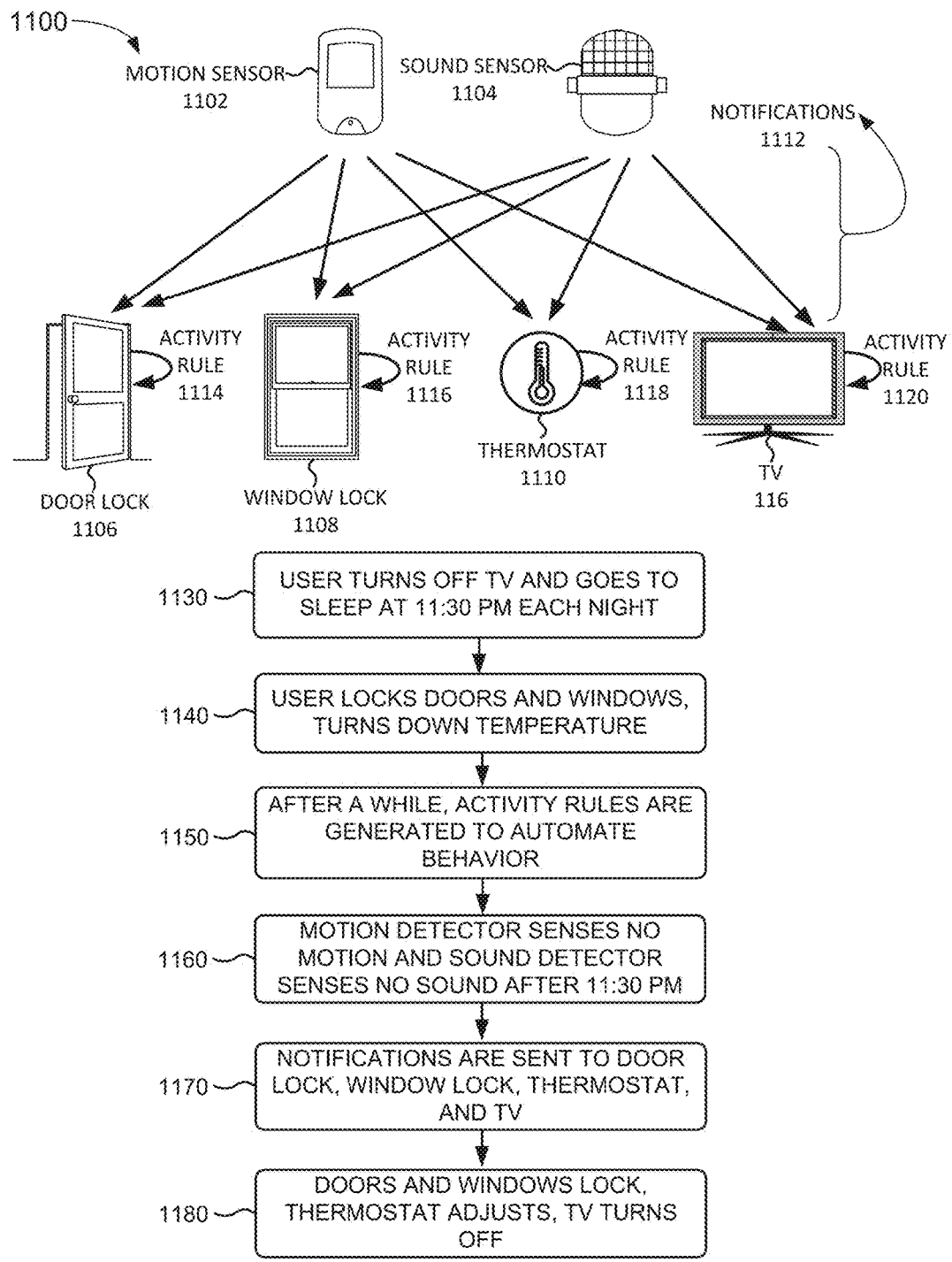
FIG. 11 is a diagram of a third exemplary scenario according to an implementation described herein.

FIG. 11 is a diagram of a third exemplary scenario 1100 according to an implementation described herein. As shown in FIG. 11, scenario 1100 includes a motion sensor 1102 and a sound sensor 1104 both sending event notifications to a door lock 1106, a window lock 1108, a thermostat 1110, and TV 116. Door lock 1106 may include an activity rule 1114 to lock if no motion and no sound are detected in the house after 11:30 PM, indicating the occupants are asleep. Similarly, window lock 1108 may include an activity rule 1116 to lock if no motion and no sound are detected in the house after 11:30 PM. Furthermore, thermostat 1110 may include an activity rule 1118 to turn down the temperature in the house if no motion and no sound are detected in the house after 11:30 PM, and TV 116 may include an activity rule 1120 to turn off if no motion and no sound are detected in the house after 11:30 PM.

Assume the user turns off TV 116 after 11:30 PM (block 1130) and goes to sleep after locking the doors and windows and after turning down the temperature on thermostat 1110 (block 1140). After the user repeats this behavior a number of times, activity rules 1114, 1116, 1118, and 1120 may be generated (block 1150). In some implementations, activity rules 1114, 1116, 1118, and 1120 may be generated automatically without user interactions. In other implementations, a user may receive prompts on TV 116, asking the use to generate activity rules 1114, 1116, 1118, and 1120.

After activity rules 1114, 1116, 1118, and 1120 are generated, motion detector 1102 may detect no motion for a particular length of time and sound sensor 1104 may detect no sounds for a particular length of time (block 1160). Motion sensor 1102 and sound sensor 1104 may be configured to generate event notifications if no motion or no sound are detected for a particular length of time and may send notifications to door lock 1106, window lock 1108, thermostat 1110, and TV 116 (block 1170). In response, activity rule 1114 may be executed to lock door lock 1106, activity rule 1116 may be executed to lock window lock 1108, activity rule 1118 may be executed to turn down thermostat 1110, and activity rule 1120 may be executed to turn off TV 116 and/or lights in the house (block 1180).

Figure 12:
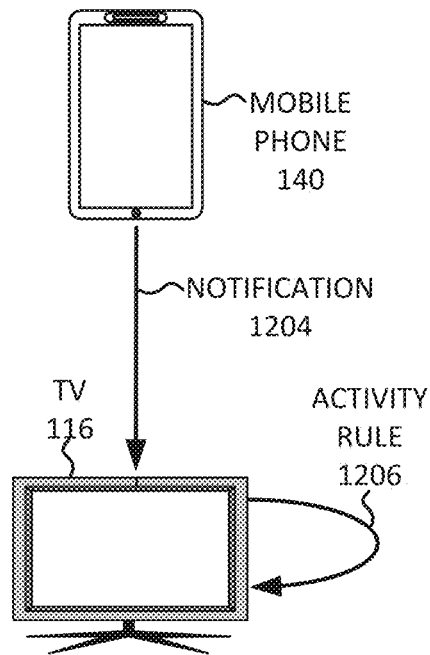
FIG. 12 is a diagram of a fourth exemplary scenario according to an implementation described herein.
Figure 12:
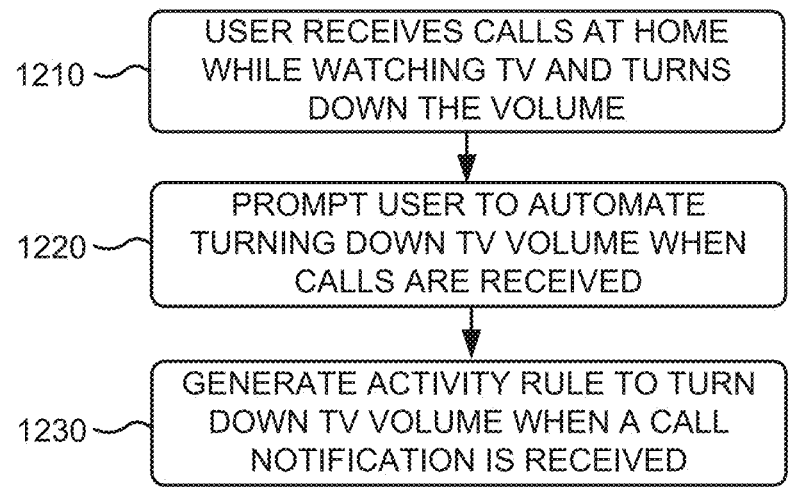

FIG. 12 is a diagram of a fourth exemplary scenario 1200 according to an implementation described herein. As shown in FIG. 12, scenario 1200 includes mobile phone sending a notification 1204 to TV 116 and TV 116 includes an activity rule 1206. Whenever the user of mobile phone 140 receives a phone call at home, the user turns town the volume of TV 116 and/or pauses TV 116 (block 1210). After a particular number of occurrences, TV 116 may prompt the user to automate turning down the volume, pause TV 116, and/or display a message identifying a calling party, when calls are received (block 1220). If the user selects to automate the activity, activity rule 1206 may be generated by TV 116 if a notification is received from mobile phone 140 that a call is being received (block 1230). The user may be provided with options to configure activity rule 1206, such as specifying that an event notification should be sent to TV 116 if the user does not answer a call to mobile phone 140 after a particular number of ring notes and/or a particular length of time after mobile phone 140 starts to ring.

Figure 13:
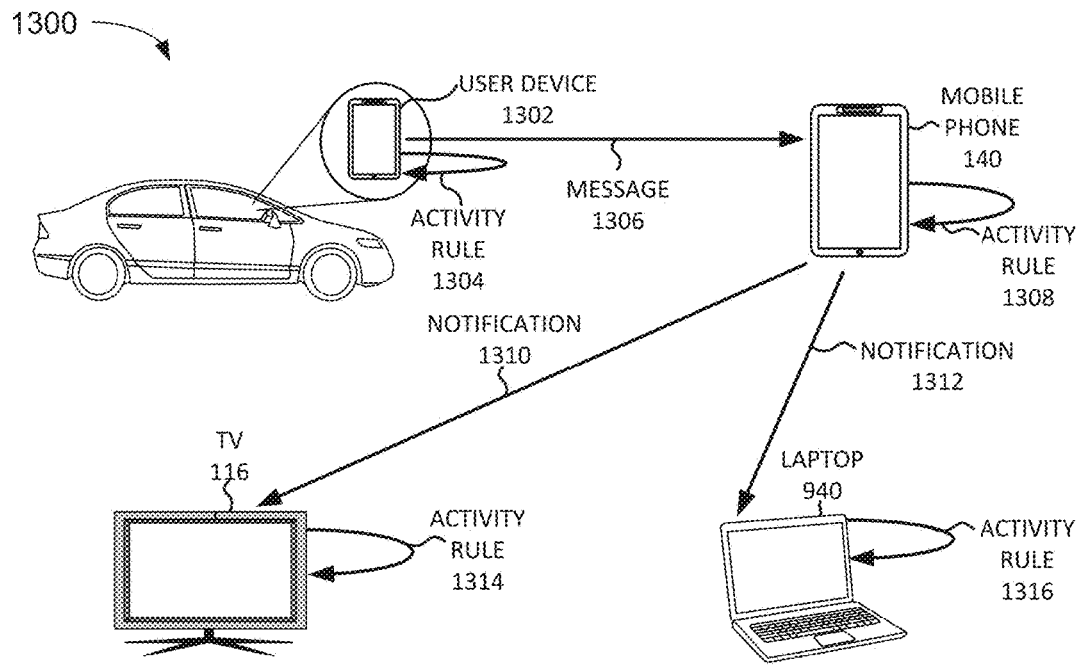
FIG. 13 is a diagram of a fifth exemplary scenario according to an implementation described herein.
Figure 13:
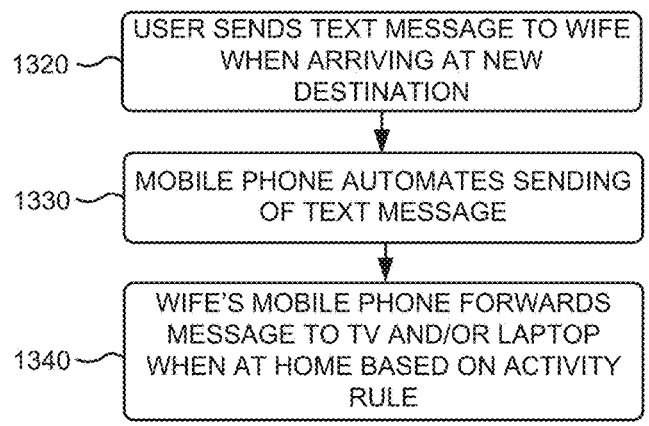

FIG. 13 is a diagram of a fifth exemplary scenario 1300 according to an implementation described herein. As shown in FIG. 13, scenario 1300 includes a user device 1302 which includes an activity rule 1304 to send a message 1306 to mobile phone 140. Mobile phone 140 includes an activity rule 1308 to send event notification 1310 to TV 116 and to send event notification 1312 to laptop 940 when an event is detected corresponding to a received message. TV 116 may include an activity rule 1314 to display messages received in mobile phone 140 and laptop 940 may include an activity rule 1316 to also display messages received in mobile phone 140.

The user of user device 1302 may send a text message to his wife (the user of mobile phone 140) whenever the user arrives at a new destination (block 1320). User device 1302 may generate activity rule 1304 to automate the sending of the text message whenever the user arrives at a new destination (block 1330). Mobile phone 140 may have generated activity rule 1308 to send a notification about received messages to TV 116 and laptop 940 (and/or to forward received messages to TV 116 and/or laptop 940) and TV 116 and laptop 940 may generate activity rules 1314 and 1316, respectively, to generate an alert about messages received by mobile phone 140 (block 1340).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 6-13, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by a computer device, the method comprising:
    joining, by the computer device, an appliance network associated with an appliance network key;
    receiving, by the computer device, a first event notification of a first event type from a first source device in the appliance network, wherein the first source device is different from the computer device, and wherein the first event notification is received via an appliance network interface configured to communicate with other appliance network interfaces in other devices in the appliance network;
    receiving, by the computer device and via the appliance network interface, a second event notification of a second event type from a second source device in the appliance network, wherein the second source device is different from the first source device and from the computer device, and wherein the second event notification and the first event notification occurred within a first time period;
    detecting, by the computer device, an activity initiated by a user in connection with the first event type and the second event type within the first time period and a particular number of times over a second time period, wherein the particular number is greater than an activity rule generation threshold that is based on at least one of the first event type, the second event type or a type of activity associated with the detected activity;
    generating, by the computer device, a user interface that includes an indication that the activity was detected in connection with the first event type and the second event type and that includes a prompt to generate an activity rule that associates the first event type and the second event type with the detected activity;
    receiving, by the computer device, a selection via the user interface to generate the activity rule;
    generating, by the computer device, the activity rule that associates the first event type and the second event type with the detected activity, in response to receiving the selection via the user interface;
    receiving, by the computer device and via the appliance network interface, a third event notification for the first event type from the first source device and a fourth event notification for the second event type from the second source device, wherein the third event notification and the fourth event notification are received within an amount of time corresponding to a length of the first time period;
    executing, by the computer device, another activity in response to the received third event notification and the received fourth event notification, based on the generated activity rule;
    receiving, by the computer device, a request to join the appliance network from a new device;
    requesting, by the computer device, the appliance network key from the new device;
    receiving, by the computer device, the appliance network key from the new device;
    assigning, by the computer device, an appliance network device identifier to the new device; and
    providing, by the computer device, a list of devices belonging to the appliance network to the new device.

2. The method of claim 1, further comprising:
    detecting a local event;
    determining that the local event corresponds to a new event type; and sending a local event notification to all of the other devices in the appliance network, in response to determining that the local event corresponds to a new event type.

3. The method of claim 2, wherein determining that the local event corresponds to a new event type includes:
determining a function call, instruction, or interrupt associated with the local event;
accessing a notification database; and
determining that an event notification entry associated with the function call, instruction, or interrupt does not exist in the notification database.

4. The method of claim 1, further comprising:
detecting a local event;
accessing a notification database to determine one or more devices in the appliance network which are to receive a local event notification for an event type associated with the local event; and
sending a local event notification to the determined one or more devices.

5. The method of claim 4, further comprising:
receiving an activity notification from the one or more devices, wherein the activity notification indicates that a particular one of the one or more devices is no longer to receive notifications for the event type; and
updating the notification database based on the received activity notification.

6. The method of claim 1, wherein the computer device, the first source device, and the second source device are located in a same customer premises location, and wherein the first and second event notifications are received via at least one of a wireless local area network connection or Near Field Communication connection.

7. The method of claim 1, wherein the computer device, the first source device, and the second source device are located in a same customer premises location, and wherein the first and second event notifications are received via a Long Term Evolution wireless connection.

8. The method of claim 1, wherein the first source device and the second source device are located in a customer premises location, and wherein executing the other activity based on the generated activity rule includes:
sending an instruction to a destination device located in the customer premises location to perform the other activity.

9. The method of claim 1, wherein the activity rule includes:
an instruction to send an activity notification to a destination device, wherein the activity notification informs the destination device that the other activity has been executed.

10. The method of claim 1, wherein the generated user interface further includes one or more options to configure the activity rule, wherein the one or more options include at least one of:
an option to select a particular time of day that the activity rule is to be in effect;
an option to select an event parameter associated with the first event type or the second event type that is to be satisfied in order for the activity rule to be executed; or
an activity parameter that is to be selected in order for the activity rule to be executed.

11. A computer device comprising:
a memory storing instructions; and
a processor configured to execute the instructions to:
join an appliance network associated with an appliance network key;
receive a first event notification of a first event type from a first source device in the appliance network, wherein the first source device is different from the computer device, and wherein the first event notification is received via an appliance network interface configured to communicate with other appliance network interfaces in other devices in the appliance network;
receive, via the appliance network interface, a second event notification of a second event type from a second source device in the appliance network, wherein the second source device is different from the first source device and from the computer device, and wherein the second event notification and the first event notification occurred within a first time period;
detect an activity initiated by a user in connection with the first event type and the second event type within the first time period and a particular number of times over a second time period, wherein the particular number is greater than an activity rule generation threshold that is based on at least one of the first event type, the second event type or a type of activity associated with the detected activity;
generate a user interface that includes an indication that the activity was detected in connection with the first event type and the second event type and that includes a prompt to generate an activity rule that associates the first event type and the second event type with the detected activity;
receive a selection via the user interface to generate the activity rule;
generate the activity rule that associates the first event type and the second event type with the detected activity, in response to receiving the selection via the user interface;
receive, via the appliance network interface, a third event notification for the first event type from the first source device and a fourth event notification for the second event type from the second source device, wherein the third event notification and the fourth event notification are received within an amount of time corresponding to the length of the first time period;
execute another activity in response to the received third event notification and the received fourth event notification, based on the generated activity rule;
receive a request to join the appliance network from a new device;
request the appliance network key from the new device;
receive the appliance network key from the new device;
assign an appliance network device identifier to the new device; and
provide a list of devices belonging to the appliance network to the new device.

12. The computer device of claim 11, wherein the processor is further configured to:
detect a local event;
access a notification database to identify one or more devices in the appliance network which are to receive a local event notification for an event type associated with the local event;
send a local event notification to the identified one or more devices;
receive an activity notification from the one or more devices, wherein the activity notification indicates that a particular one of the one or more devices is no longer to receive notifications for the event type; and
update the notification database based on the received activity notification.

13. The computer device of claim 11, wherein the computer device, the first source device, and the second source device are located in a same customer premises location, and wherein the first and second event notifications are received via at least one of a wireless local area network connection or a Near Field Communication connection.

14. The computer device of claim 11, wherein the computer device, the first source device, and the second source device are located in a same customer premises location, and wherein the first and second event notifications are received via a Long Term Evolution wireless connection.

15. The computer device of claim 11, wherein the generated user interface further includes one or more options to configure the activity rule, wherein the one or more options include at least one of:
an option to select a particular time of day that the activity rule is to be in effect;
an option to select an event parameter associated with the first event type or the second event type that is to be satisfied in order for the activity rule to be executed; or
an activity parameter that is to be selected in order for the activity rule to be executed.

16. The computer device of claim 11, wherein the processor is further configured to:
detect a local event;
determine that the local event corresponds to a new event type; and
send a local event notification to all of the other devices in the appliance network, in response to determining that the local event corresponds to a new event type.

17. A non-transitory computer-readable medium storing instructions executable on one or more processors, the non-transitory computer-readable medium comprising:
one or more instructions to join an appliance network associated with an appliance network key;
one or more instructions to receive, at a computer device, a first event notification of a first event type from a first source device in the appliance network, wherein the first source device is different from the computer device, and wherein the first event notification is received via an appliance network interface configured to communicate with other appliance network interfaces in other devices in the appliance network;
one or more instructions to receive, via the appliance network interface, a second event notification of a second event type from a second source device in the appliance network, wherein the second source device is different from the first source device and from the computer device, and wherein the second event notification and the first event notification occurred within a first time period;
one or more instructions to detect an activity initiated by a user in connection with the first event type and the second event type within the first time period and a particular number of times over a second time period, wherein the particular number is greater than an activity rule generation threshold that is based on at least one of the first event type, the second event type or a type of activity associated with the detected activity;
one or more instructions to generate a user interface that includes an indication that the activity was detected in connection with the first event type and the second event type and that includes a prompt to generate an activity rule that associates the first event type and the second event type with the detected activity;
one or more instructions to receive a selection via the user interface to generate the activity rule;
one or more instructions to generate the activity rule that associates the first event type and the second event type with the detected activity, in response to receiving the selection via the user interface;
one or more instructions to receive, via the appliance network interface, a third event notification for the first event type from the first source device and a fourth event notification for the second event type from the second source device, wherein the third event notification and the fourth event notification are received within an amount of time corresponding to a length of the first time period; and
one or more instructions to execute another activity in response to the received third event notification and the received fourth event notification, based on the generated activity rule;
one or more instructions to detect a local event;
one or more instructions to access a notification database to identify one or more devices in the appliance network which are to receive a local event notification for an event type associated with the local event;
one or more instructions to send a local event notification to the identified one or more devices;
one or more instructions to receive an activity notification from the one or more devices, wherein the activity notification indicates that a particular one of the one or more devices is no longer to receive notifications for the event type; and
one or more instructions to update the notification database based on the received activity notification.

18. The non-transitory computer-readable medium of claim 17, further comprising:
one or more instructions to receive a request to join the appliance network from a new device;
one or more instructions to request the appliance network key from the new device;
one or more instructions to receive the appliance network key from the new device;
one or more instructions to assign an appliance network device identifier to the new device; and
one or more instructions to provide a list of devices belonging to the appliance network to the new device.

19. The non-transitory computer-readable medium of claim 17, wherein the generated user interface further includes one or more options to configure the activity rule, wherein the one or more options include at least one of:
an option to select a particular time of day that the activity rule is to be in effect;
an option to select an event parameter associated with the first event type or the second event type that is to be satisfied in order for the activity rule to be executed; or
an activity parameter that is to be selected in order for the activity rule to be executed.

20. The non-transitory computer-readable medium of claim 17, wherein the computer device, the first source device, and the second source device are located in a same customer premises location, and wherein the first and second event notifications are received via a Long Term Evolution wireless connection.

* * * * *